UNITED STATES PATENT OFFICE.

FREDERICK C. ATKINSON, OF INDIANAPOLIS, INDIANA.

PROCESS OF REDUCING FATS AND MIXTURES CONTAINING THE SAME TO POWDER FORM.

1,286,903.                    Specification of Letters Patent.    Patented Dec. 10, 1918.

No Drawing.            Application filed July 31, 1917.   Serial No. 183,725.

*To all whom it may concern:*

Be it known that I, FREDERICK C. ATKINSON, a citizen of the United States, residing at Indianapolis, Marion county, and State of Indiana, have invented and discovered certain new and useful Improvements in Processes of Reducing Fats and Mixtures Containing the Same to Powder Form, of which the following is a specification.

My invention relates to processes of reducing fats and mixtures containing the same to powder form.

The object of the invention is to enable a fat, particularly a hard or hardened fat, to be economically and rapidly reduced to a dry, pulverulent condition.

The term fat as used herein includes fatty oils, and the invention relates particularly to what may be generally characterized as the stearin fats. Some of these fats are naturally hard and the others may be hardened by hydrogenation. Cotton seed oil and corn oil may be employed.

The invention consists in spraying the fat alone, or mixed with other substances, into a chamber the temperature of which is less than the congealing point of the fat. The fat is first melted and then forced while hot through a suitable sprayer into a closed chamber the temperature of which is suitably regulated according to atmospheric conditions so as to keep the same less than the congealing point of the fat with the object of preventing coalescence thereof, and as the spray strikes the relatively cool air it will be solidified into fine particles and fall to the bottom of the chamber in the form of a fine powder.

The invention also has application to the production of a baking powder having the active elements thereof isolated chemically from one another and protected from combination under the action of the water used in dough making and under atmospheric temperatures, and adapted to be released from the inhibitive coating of fat for combination to effect gasification, only upon the application of the heat of baking.

In forming a baking powder according to my process, either one or both of the active elements of the baking powder is intimately mixed with the molten fat and then the mixture thoroughly agitated and while hot and under such agitation, sprayed into the cooler chamber, whereupon the fat and the element or elements will be thrown down in a dry powder with the particles of the active element or elements covered with a fatty coating. The completed product is a dry powder with the active element chemically separated and inhibited from combination until the application of the heat used in baking.

The acid element of the baking powder may be either in powder or liquid form, and may be either soluble or insoluble in oil. It may be tartaric acid, potassium bitartrate, the acid phosphates of calcium and sodium, or lactic acid, or butyric acid. The base may be sodium bicarbonate or other carbonic acid yielding chemicals.

Having thus described my invention, what I claim is:—

1. The process which consists in melting a fat, mixing the same while in a molten condition with an active element of a baking powder, and then spraying the mixture into a chamber the temperature of which is lower than the congealing point of the fat.

2. The process which consists in melting a fat and mixing therewith an active element of a baking powder and agitating the mixture and spraying the mixture while hot into a chamber the temperature of which is lower than the congealing point of the fat.

In witness whereof, I have hereunto set my hand and seal at Indianapolis this 17th day of July, A. D. nineteen hundred and seventeen.

FREDERICK C. ATKINSON. [L. S.]

Witnesses:
   H. P. DOOLITTLE,
   M. L. SHULER.